United States Patent

Hoffman et al.

[15] 3,648,063

[45] Mar. 7, 1972

[54] MODIFIED STORAGE CIRCUIT FOR SHIFT REGISTER

[72] Inventors: William K. Hoffman, Shelburne; John W. Sumilas, Williston, both of Vt.

[73] Assignee: International Business Machines Corporation, Armonk, N.Y.

[22] Filed: Jan. 28, 1970

[21] Appl. No.: 6,497

[52] U.S. Cl. ..........................307/221 C, 307/238, 307/251, 307/279

[51] Int. Cl...........................................................G11c 19/00

[58] Field of Search.......................307/251, 221 C, 238, 279

[56] References Cited

UNITED STATES PATENTS

| | | | |
|---|---|---|---|
| 3,252,009 | 5/1966 | Weimer | 307/221 C |
| 3,322,974 | 5/1967 | Ahrons et al. | 307/221 C |
| 3,524,077 | 8/1970 | Kaufman | 307/221 C |
| 3,518,451 | 6/1970 | Booher | 307/251 X |

OTHER PUBLICATIONS

Application Notes of General Instrument Corp., Dec. 1967, by Sidorsky, pp. 1–5

*Primary Examiner*—John S. Heyman
*Attorney*—Hanifin and Jancin and Willis E. Higgins

[57] ABSTRACT

A field effect transistor (FET) shift register storage circuit has a first and second FET series connected from the drain of the first FET to the source of the second FET. A storage capacitor is connected between the gate and source of the first FET. A pulse source is connected to the source of the first FET, and data stored on the capacitor is supplied to the gate of the first FET. A clocking pulse source is connected to the gate of the second FET and is adapted to provide a clocking pulse to the second FET in overlapping relationship to a pulse from the pulse source supplied through the first FET for a storage capacitor of a subsequent storage circuit. In this arrangement, both data input to the storage cell and a pulse for the storage capacitor of a subsequent storage circuit are to the first FET. This storage circuit is both very compact and of simplified structure in integrated form.

10 Claims, 5 Drawing Figures

INVENTORS
WILLIAM K. HOFFMAN
JOHN W. SUMILAS

BY *Willis E. Higgins*

ATTORNEY

MODIFIED STORAGE CIRCUIT FOR SHIFT REGISTER

CROSS REFERENCE TO RELATED APPLICATION

A copending, commonly assigned application by William K. Hoffman, entitled "Storage Circuit for Shift Register," filed on the same day as the present application, covers a circuit for a shaft register and a shift register which may utilize the present invention.

1. Field of the Invention

This invention relates to solid-state shift registers. More particularly, it relates to an integrated circuit FET shift register of simplified construction which may be made smaller than conventional FET shift registers, and which is therefore particularly suited for large capacity memory applications.

The present invention is an improvement of the embodiment of an invention disclosed and claimed in the above referenced copending application by William K. Hoffman. That embodiment, though it has a total of two capacitive elements and two FET's in each storage cell, may be made in more compact form than an FET storage cell containing only one capacitive element between two series-connected FET's. A potential exists for an even more compact shift register storage circuit than the embodiment disclosed by Hoffman, if a way can be found to reduce the number of capacitive elements required, without requiring a corresponding increase in integrated circuit area for the remaining capacitive elements.

2. Description of the Prior Art

Commonly assigned A. S. Farber et al., U.S. Pat. No. 3,461,312, discloses an FET shift register circuit in which capacitance values need not be as large as in a storage circuit consisting of a single capacitive element between two series-connected FET's. However, the circuits there disclosed require a total of three FET's per storage circuit of the shift register. Thus, there remains a need for an FET shift register circuit which is both of simplified construction and smaller in size.

SUMMARY OF THE INVENTION

Accordingly, it is an object of the invention to provide a shift register having both a minimum number of circuit elements and a more compact size.

It is another object of the invention to provide a shift register requiring only two FET's and a single storage means for each storage cell in the register, and in which the storage cells are of more compact size.

It is another object of the invention to provide an FET shift register storage circuit having a first FET which supplies a pulse for a storage means of a subsequent storage circuit and a second FET operating as a switch between the first FET and the storage means in which a further storage means between the first and second FET's is not necessary.

It is a further object of the invention to provide a shift register storage circuit consisting of only two FET's and a capacitor, with the capacitor serving both as a data storage means and as a way to provide a charging pulse for a storage capacitor in a subsequent storage circuit of the shift register, and further to provide a shift register in integrated circuit form utilizing such storage circuits.

The attainment of these and related objects may be realized through the present invention, which is based on the discovery that a temporary storage capacitor located between two series-connected FET's may be eliminated in a shift register storage circuit if a pulse intended for a storage capacitor of a subsequent storage circuit is supplied in overlapping time relationship with a clocking pulse to the second FET.

In accordance with the invention, a shift register storage circuit requires no more elements than the following. First and second field effect transistors each having first and second current flow electrodes and a gate electrode are connected in series by the second current flow electrode of the first FET and the first current flow electrode of the second FET. A first storage means, preferably capacitive in nature, is connected to the gate electrode of the first FET. A source of a signal (e.g., a data input) is connected to the first storage means. Means is provided for supplying a pulse for a second storage means of a subsequent storage circuit independent of a signal applied from the first storage means to the gate of the first FET. A clocking pulse source is connected to the gate of the second FET and is adapted to provide a clocking pulse in overlapping relationship to the pulse for the second storage means of the subsequent storage circuit.

By providing the clocking pulse to the gate of the second FET, serving as a switch between the second storage means and the first FET, in overlapping relationship to the pulse for the second storage means, the necessity for a temporary storage means between the first and second FET's is eliminated, thus reducing both the number of circuit elements required in a storage circuit and the area of such a storage circuit in integrated form.

In a preferred form, the pulse for the second storage means (which is a capacitor) is provided through the first FET by connecting the source and gate of the first FET with a capacitor, which serves as the first storage means, and applying the pulse for the second storage capacitor to the source of the first FET. By capacitive coupling, the AC component of this pulse is also applied to the gate of the first FET, turning it on if a signal pulse is not already being applied to its gate, and therefore allowing transmission of the pulse for the second storage capacitor through the first FET independent of any separate signal to the gate of the first FET. The second storage capacitor, which is the storage capacitor of a succeeding storage circuit, is also connected between the gate and source of the first FET in the succeeding storage circuit. A shift register utilizing this embodiment of the invention therefore has only one capacitor per storage cell in the register.

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
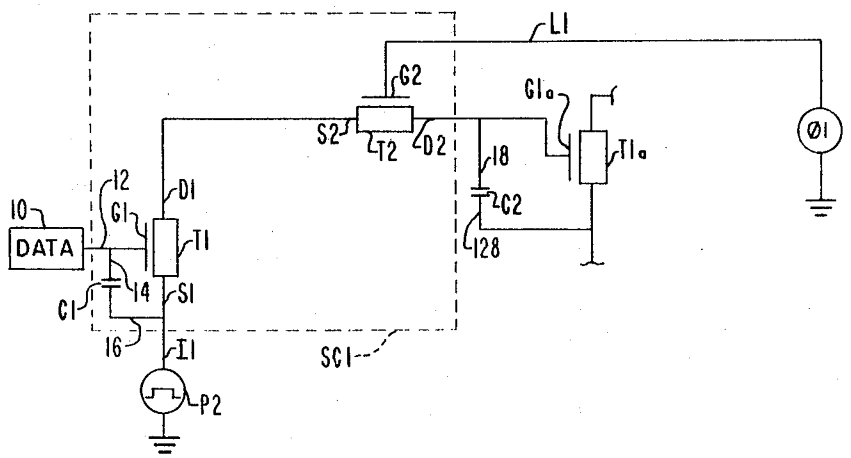
FIG. 1 is a schematic diagram of a circuit in accordance with the invention forming a single storage circuit of a shift register.

Turning now to the drawings, more particularly to FIG. 1, there is shown a single shift register storage circuit SC1 in accordance with the invention. In the following discussion, all FET's are assumed to be of the n-channel type. P-channel FET's may alternatively be employed, in which case the positive polarity of signals supplied to the gates of the FET's in the following discussion must be reversed. It is further assumed that the circuit in integrated form is operated with a negative substrate bias, causing the FET's to operate in the enhancement mode. FET T1 having current flow electrodes S1 and D1 and FET T2 having current flow electrodes S2 and D2 are series connected by their current flow electrodes D1 and S2. Data input source 10 is connected by line 12 to electrode 14 of storage capacitor C1, which is also connected to gate G1 of FET T1. The other electrode 16 of storage capacitor C1 is connected to current flow electrode S1 of FET T1.

Storage capacitor C2 of a subsequent storage circuit is connected to current flow electrode D2 of FET T2 by its electrode 18. Source P2, connected by line 11 to current flow electrode S1 of FET T1 and to electrode 16 of storage capacitor C1, supplies pulses to storage capacitor C2 of a subsequent storage circuit through FET's T1 and T2. To allow pulses from source P2 to be transmitted to storage capacitor C2, a pulse form source P2 serves to turn on FET T1 by capacitive coupling to gate G1 through capacitor C1 in the absence of another signal to its gate. If another signal is already being supplied to gate G1 of FET T1 by virtue of a charge stored on storage capacitor C1, FET T1 is already turned on, and the pulse from source P2 is simply transmitted through FET T1. To turn on FET T1 in the absence of another signal to the gate G1 of FET T1, the AC component of the pulse from source P2 transmitted through capacitor C1 must be of sufficient magnitude to exceed the threshold voltage of FET T1. Data supplied from data input source 10 and stored on storage capacitor C1 can be considered a constant charge in the case of a "1" and the absence of a constant charge in the case of a "0," when compared to the duration of pulses from source P1. The capacitive connection through C1 does not affect the state of the data, nor does transmission of the pulse from source P2 through C1 to gate G1 of FET T1 affect the data. At the termination of a pulse from source P2, storage capacitor C1 retains its prexisting data state. FET T2 is turned on by the application of a pulse from source 01 connected to its gate G2 by line L1. The clocking pulse from source 01 overlaps the pulse for storage capacitor C2 from pulse source P2. That is, the clocking pulse begins while the pulse from source P2 is still being applied or prior to application of the pulse from source P2, then continues after the pulse from source P2 for storage capacitor C2 has terminated. Operation in this manner allows storage capacitor C2 of a subsequent storage circuit to be charged by the pulse from source P1 through FET's T1 and T2, then to be discharged or not to be discharged depending on the presence or absence of a date signal from storage capacitor C1 applied to gate G1 of FET T1. If a signal is being applied from storage capacitor C1 to gate electrode G1 of FET T1, indicating the presence of a "1," FET T1 is turned on, and the charge on storage capacitor C2 is drained away to ground through FET's T2 and T1, and source P2. If no signal is being applied from storage capacitor C1 to gate G1 of FET T1, FET T1 is off, and no path to ground exists to discharge storage capacitor C2.

In its charged condition, storage capacitor C2 acts to supply a positive signal to gate G1*a* of FET T1*a*, storing in inverted form the absence of a charge present on storage capacitor C1 of storage circuit SC1 in the subsequent storage circuit. FET T1*a* constitutes the first FET of storage circuit SC4*a* shown in FIG. 2, which is identical to circuit SC1. In its discharged condition, storage capacitor C2 applies no signal to gate G1a of FET T1*a*, indicating storage in inverted form in storage circuit SC4*a* of a charge present on storage capacitor C1 of storage circuit SC1. The data from storage capacitor C1 is therefore stored in inverted form on storage capacitor C2 by operation of the circuit SC1. Within a shift register, the data input source 10 actually comprises a circuit identical to that shown, connected to storage capacitor C1 of storage circuit SC1. Each of the capacitors in the shift register serves both as a storage capacitor of a circuit and as a way of providing a pulse through the first FET of a storage circuit for the storage capacitor of a succeeding storage circuit, independent of a separate signal applied to the gate of the first FET.

Figure 2:
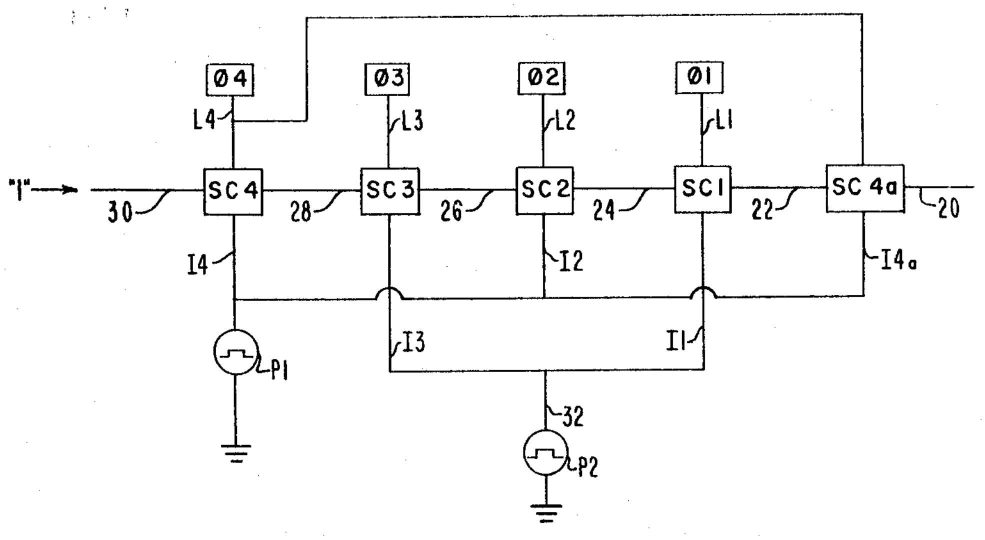
FIG. 2 is a block diagram showing a portion of a shift register composed of a plurality of the circuits in FIG. 1.
Figure 3:
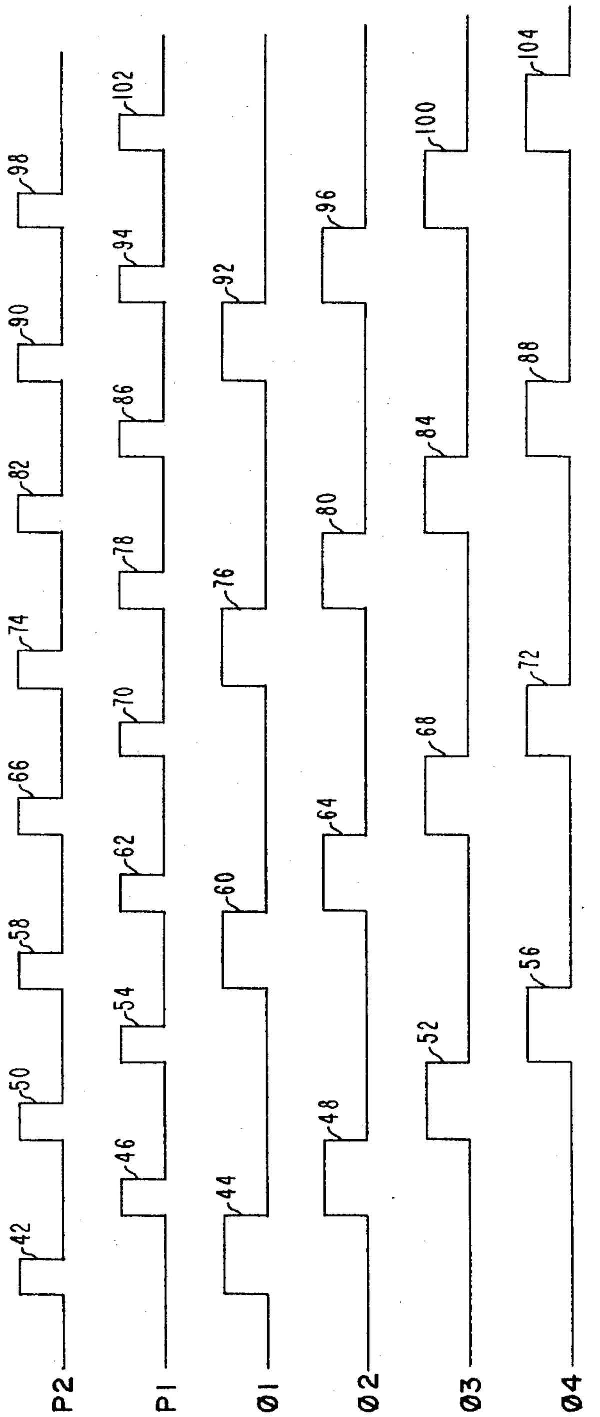
FIG. 3 is a set of pulses used to propagate date through the portion of the shift register in FIG. 2.

FIGS. 2 and 3 show the operation of storage circuits as shown in FIG. 1 in more detail in a shift register, by depicting the pulses necessary to shift a date bit "1" from storage circuit SC4 to storage circuit SC4*a* in FIG. 2. The storage circuits SC4, SC3, SC2, SC1 and SC4*a*, each containing circuitry identical to storage circuit SC1 in FIG. 1, are arranged for operation with staggered clocking pulses, from clocking pulse sources 04 to 01, connected to each of the storage circuits by lines L4 to L1, respectively. Interconnections 20, 22, 24, 26, 28, and 30 each serve to connect the second FET of a storage circuit located to the left of the interconnection and capacitor of a storage circuit to the right of the interconnection. For example, interconnection 22 connects drain electrode D2 of FET T2 in storage circuit SC1 and storage capacitor C2 of storage circuit SC4a. Storage circuit SC2 of FIG. 2 performs the function of the data input source 10 in FIG. 1 for storage circuit SC1, and storage circuit SC1 performs this function for storage circuit SC4*a*. Pulse source Pi is connected to the even numbered storage circuits, i.e., circuits SC4, SC2, and SC4*a* by lines I4, I2, and I4*a*, respectively. Pulse source P2 is connected to the odd numbered storage circuits, i.e., circuits SC3 and SC1, by lines I3 and I1, respectively. This same pattern is carried out in preceding and succeeding storage circuits in the shift register. A complete register will usually contain over 100 storage circuits.

In the ensuring discussion, it is assumed that there is other information present in the register in addition to the date bit "1" shown at input 30 to storage circuit SC4 due to previous operation of the register in the manner described below, but the other data will not be identified or its movement described in detail. The pulse program of FIG. 4 begins with a pulse 42 from pulse source P2 and a simultaneous pulse 44 from clocking pulse source 01. At this point, it is assumed that there is a vacancy of desired information at the storage capacitor C2 of storage circuit SC4*a*, and the function of these two pulses is to transfer data at the storage capacitor C1 of storage circuit SC1 to the storage capacitor C2 of storage circuit SC4*a*. During the period of time pulses 42 and 44 coincide, both FET's T1 and T2 are on, and the pulse 42 from source P2 applied to source electrode S1 of FET T1 is transmitted through the two FET's to storage capacitor C2. Pulse 42 is also transmitted to the first FET of storage circuit SC3 only due to a common interconnection line 32 from source P2. The pulse 42 serves no useful function at storage circuit SC3, since no vacancy exists on storage circuit SC2 for transfer of information from storage circuit SC3. Source 03 does not provide a pulse to the second FET of storage circuit SC3 at this time, so the pulse 42 does not reach the storage capacitor of storage circuit SC2. Similarly, the other pulses from sources P1 and P2 supply pulses to more than the one storage circuit transferring information. Pulse 42 terminates while pulse 44 continues, and the charge on storage capacitor C2 now drains away to ground if a charge from data stored on storage capacitor C1 is present on gate electrode G1 of FET T1, If no charge from data stored on storage capacitor C1 is present on gate electrode G1 of FET T1, no discharge path to ground for the charge on storage capacitor C2 exists, and the charge remains. The data present on storage capacitor C1 is therefore transferred in inverted form to storage capacitor C2 and a vacancy is created at storage capacitor C1. It should be noted that, for each transfer of a bit of information from left to right, there is a vacancy created at the storage capacitor from which the information is transferred. Termination of pulse 44 from clocking pulse source 01 now turns off FET T2 and isolates the information at storage capacitor C2 of storage circuit SC4*a* from the remainder of circuit SC1. Simultaneous pulses 46 from source P1 for charging storage capacitor C1 of circuit SC1, and pulse 48 from clocking pulse source 02 now operate to transfer information on the storage capacitor of storage circuit SC2 to the storage capacitor C1 of storage circuit SC1 and create a vacancy at the storage capacitor of storage circuit SC2. This transfer is accomplished in the same manner as above. Similarly, at the conclusion of pulse 48 from clocking pulse source 02, simultaneous pulses 50 from pulse source P2 and 52 from clocking pulse source 03 act to transfer data from the storage capacitor of storage circuit SC3 to the storage capacitor of storage circuit SC2 and create a vacancy at the storage capacitor of storage circuit SC3. At the conclusion of pulse 52 from clocking pulse 03, the storage circuits are now ready for transfer of the data bit 1 shown at storage circuit SC4 to storage circuit SC3.

Pulse 54 from pulse source P1 supplies the charging pulse through storage circuit SC4 for the storage capacitor of storage circuit SC3, which is connected to the drain electrode of the second FET in the storage circuit SC4. Since the data is a "1," a positive charge, the first FET in storage circuit SC4, is on and the pulse 54 is transmitted through it. Simultaneous clocking pulse 56 from clocking pulse source 04 turns on the second FET in storage circuit SC4, to allow the charging pulse 54 to reach the storage capacitor of storage circuit SC3. Charging pulse 54 now terminates, but clocking pulse 56 continues, leaving the second FET of storage circuit SC4 turned on. Since a data bit "1" is present at input node 30 to storage circuit SC4, a positive signal is being applied to the gate of the first FET in storage circuit SC4, and it is also on. A path is therefore provided to discharge the storage capacitor of storage circuit SC3 through FET's T2 and T1 and source P1 to ground, thus providing an absence of charge at the storage capacitor of storage circuit SC3, indicating the data bit "1" initially present at storage circuit SC4 in inverted form. A vacancy has now been created at storage circuit SC4. Simultaneously, a vacancy was created at storage circuit SC4a due to transfer of information through it.

In the same manner, pulses 58, 60, 62, 64, 66, 68, 70 and 72 transfer one bit of information through each of the storage circuits SC4 to SC1, with the data bit "1" now stored at storage circuit SC3 being transferred to storage circuit SC2 by overlapping pulse 66 from source P2 and pulse 68 from source 3. Transfer of information through the four storage circuits SC4 to SC1 continues with pulses 74, 76, 78, 80, 82, 84, 86 and 88. The data bit "1" is transferred from storage circuit SC2 to storage capacitor C1 of storage circuit SC1 in the form of the absence of a charge by overlapping pulse 78 from source P1 and clocking pulse 80 from source 2. Pulses 90, 92, 94, 96, 98, 100, 102 and 104 continue the transfer of information. The date bit "1" is transferred from storage circuit SC1 to storage circuit SC4*a* by overlapping pulse 90 from pulse source P2 and pulse 92 from clocking pulse source 1. The date bit "1" is present as the absence of a charge on storage capacitor C1 of storage circuit SC1. Pulse 90 is applied to source electrode S1 of FET T1, and, by capacitive coupling through storage capacitor C1, the AC component of the pulse 90 at gate G1 turns FET T1 on, allowing the pulse 90 to be transmitted through FET T1 without the application of any other signal to gate electrode G1. Simultaneously, pulse 92 from source 1 to gate G2 of FET T2 turns FET T2 on, allowing the pulse 90 to be transmitted through FET T2 to storage capacitor C2 of storage circuit SC4*a*, charging it. Pulse 90 now terminates and FET T1 is turned off. Pulse 92 terminates and turns off FET T2 and isolates charged storage capacitor C2 of storage circuit SC4a from the remainder of storage circuit SC1. The transfer of data "1" through the four storage circuits SC4 to SC1 is now complete.

The above staggered clocking pulse concept means that, with four clocking pulses as shown, only one storage circuit vacant of desired information need be provided for each three storage circuits containing desired information. Conventional shift registers require a storage circuit vacant of desired information for each storage circuit containing desired information, since all information is shifted at once by simultaneous, rather than staggered, clocking pulses.

It should be noted that the overlapping pulses of FIG. 3 have been depicted as coming from separate sources, which is not necessary. Pulses 42 and 44 can come from the same source provided that triggering circuitry is provided to cause pulse 42 to terminate prior to the termination of pulse 44.

Figure 4:
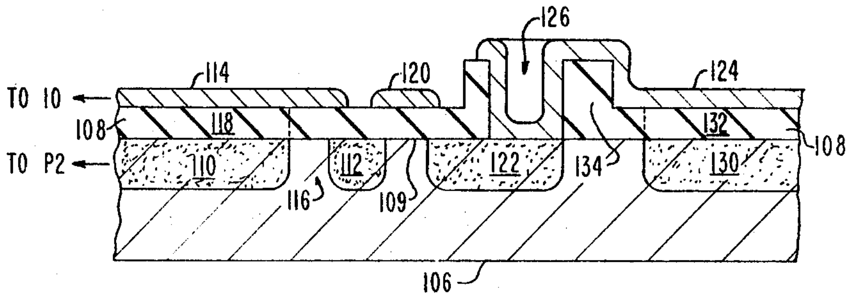
FIG. 4 is a cross section of an integrated circuit embodiment of the circuit shown in FIG. 1.

FIG. 4 shows circuit SC1 of FIG 1 in integrated form. There is shown a semiconductor substrate 106 having an insulation layer 108 on its surface 109. Source and drain electrodes S1 and D1 of FET T1 are formed by diffusions 110 and 112, respectively. Gate electrode G1 of FET T1 is formed by metallization layer 114 overlying channel region 116 between diffusion 110 and 112 in substrate 106. Electrode 14 of storage capacitor C1 is also formed by metallization layer 114. The other electrode 16 of storage capacitor C1 comprises the diffusion 110. The portion 118 of insulation layer 108 between metallization layer 114 and diffusion 110 forms the dielectric of the capacitor C1. Metallization layer 114 is connected to the date input source 10, and diffusion 110 is connected to pulse source P2.

In addition to forming drain electrode D1 of FET T1, diffusion 112 also forms the source electrode S2 of FET T2. Metallization line 120 forms the gate electrode G2 of FET T2 and is connected to clocking pulse source 1. Diffusion 122 forms the drain electrode D2 of FET T2. Electrode 18 of storage capacitor C2 in storage circuit SC4*a* is formed by metallization pattern 124, which is connected to diffusion 122 by contact 126. The other electrode 128 of capacitor C2 is formed by diffusion 130. The portion 132 of insulation layer 108 between metallization pattern 124 and diffusion 130 forms the dielectric of storage capacitor C2.

The integrated circuit of FIG. 4 may be formed by processes known in the art. For example, the process for making FET integrated circuits disclosed in commonly assigned Couture et al., application Ser. No. 791,214, filed Jan. 15,1969, the disclosure of which is incorporated herein by reference, may be employed.

When embodied in the integrated circuit form shown in FIG. 4, and with an amplitude of about 8 volts for the pulses shown in FIG. 3, the storage capacitors of a shift register may have a value of about 0.2 picofarad and give excellent performance in a shift register having over 100 storage cells. The output of such a shift register can be connected to its input and the information stored therein kept circulating for long periods of time until it is needed, with low power consumption. The 8-volt level for the charging pulses and clocking pulses is about the maximum that can be delivered to the storage circuits of the shift register without degrading performance due to unwanted signals produced by parasitic thick oxide FET devices. Such parasitic thick oxide FET devices are formed wherever a metallization pattern overlies a thick, oxide region 134 over a channel between two diffusions. Because the necessity of a temporary storage capacitor between the first and second FET's of a storage circuit has been eliminated by the overlapping clocking pulses, a storage circuit size in integrated form of only 3 square mils is obtained with the above capacitance value and pulse voltages. This compares with a size of 4 square mils when overlapping clocking pulses are not provided, and a temporary storage capacitor between the first and second FET's of a storage circuit is required.

Figure 5:
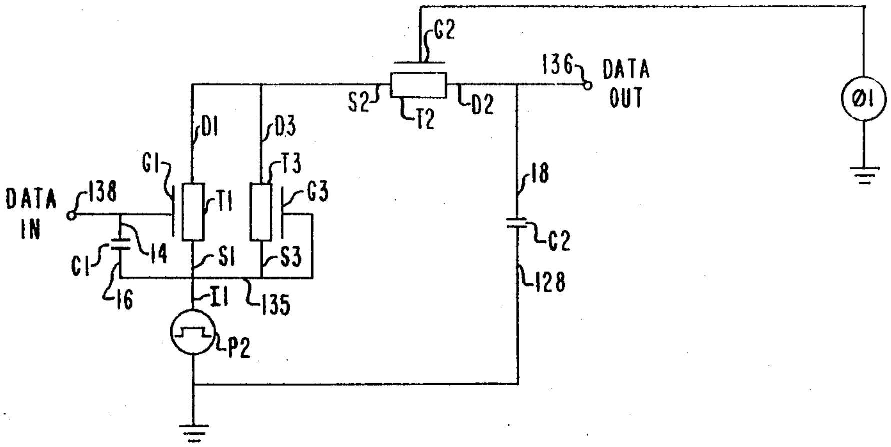
FIG. 5 is a schematic diagram of another embodiment of the invention, which may be used in combination with the embodiment of FIG. 1 to give a further improved shift register.

FIG. 5 shows another embodiment of the invention which may be used with the embodiment of FIG. 1 to give an increased output signal. As in FIG. 1, the circuit has FET's T1 and T2, series connected by their current flow electrodes D1 and S2. Storage capacitor C1 is connected between current flow electrode S1 and gate electrode G1 of FET T1 by its electrodes 14 and 16. Storage capacitor C2 is connected to current flow electrode D2 of FET T2 by its electrode 18, and to ground by its electrode 95 128. FET T3 is added to the circuit across FET T1 to give an enhanced charging signal for storage capacitor C2. Current flow electrode S3 and gate electrode G3 of FET T3 have a common connection to current flow electrode S1 of FET T1 and pulse source P1 by lines I1 and 135. Current flow electrode D3 of FET T3 is connected to current flow electrode D1 of FET T1.

In this configuration, FET T3 acts as an FET diode. Thus, FET T3 could be replaced with another type of diode, e.g., a Schottky diode. A portion of the charging pulse for storage capacitor C2 continues to pass through FET T1 by virtue of the connection through capacitor C1 between its current flow electrode S1 and gate electrode G1. The remainder of the charging pulse from source P1 passes through T3. If it is desired to pass all of the charging pulse for storage capacitor C2 through FET T3, the electrode 16 of capacitor C1 may be grounded, rather than connected to source P1. This approach for the output storage cell of a shift register is often advantageous from a noise reduction standpoint. Both components of the pulse from source P1 are supplied to charge storage capacitor C2 through FET T2, due to the application of a simultaneous pulse from source 1 applied to gate G2 of FET T2.

When used as the data output cell of a shift register, information is read out of the register at the data out terminal 136. The data in terminal 138 is connected to the second FET of the previous storage circuit in the shift register.

The circuit of FIG. 5 may also be used as the initial or data input storage circuit of the shift register. When so employed, the data in terminal 138 is connected to suitable input circuitry (not shown) for the shift register. When used as the initial date input storage circuit of the shift register, the storage capacitor C1 may be omitted, and all of the charging pulse for storage capacitor C2 supplied through FET T3, if desired. The data out terminal 136 of the circuit is connected to the gate of the first FET of a succeeding storage circuit, and electrode 128 of storage capacitor C2 is connected to a current flow electrode of the same FET, in a manner analogous to capacitor C1.

The use of the circuit in FIG. 5 as the initial data input storage circuit and the data output circuit of the shift register means that a substantially enhanced charging pulse may be supplied at the input end of the register, and a substantially enhanced output signal may be obtained at the output end of the register, both without a substantial overall increased use of integrated circuit chip area. It should be recognized that the provision of FET T3 as in FIG. 5 results in a somewhat larger circuit in integrated form than that of FIG. 1, due to the extra interconnection lines required, and the use of the embodiment of FIG. 5 as an internal storage circuit of a shift register is therefore not as advantageous as the use of the circuit of FIG. 1, from an integrated circuit area standpoint.

The above description has been in terms of individual storage circuits or several storage circuits forming a portion of the complete shift register. An actual complete shift register would contain over 100 of the circuits of the type shown in FIG. 1. Due to the simplified and smaller storage circuit, a plurality of shift registers each containing over 100 storage circuits may be contained in a single integrated circuit chip measuring only about 0.1 inch by 0.1 inch and containing a total of about 2,800 of the circuits shown in FIGS. 1 and 4, eight clocking pulse phase gates, 12 input-output circuits for the shift registers, and connection pads for communication with the outside world.

It should now be apparent that a storage circuit of simplified construction and shift register containing the storage circuit suitable for attaining the stated objects of the invention has been provided. The number of circuit elements in the circuit has been reduced to two active elements and a storage means, while at the same time reducing the area required for the shift register storage circuit. This result is obtained by providing charging pulses for the storage means of a subsequent storage circuit through a first FET in the circuit, and overlapping clocking pulses to the second FET in the circuit, thus eliminating the necessity for temporary storage means between the first and second FET. The features of a simplified storage circuit and a smaller storage circuit make shift registers utilizing the invention of particular value in large capacity memory applications. The invention makes realizable a large capacity memory capable of storing about 12 million bits of information at a cost to produce the memory low enough for large scale memory applications, with an average access time of about 50 microseconds. Such large memory capacity has hitherto been realizable only with great difficulty in static magnetic memories or with electromechanically accessed memories, such as disk files, which are far slower and less reliable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit comprising:

A. first and second field effect transistors each having two current flow electrodes and a gate electrode, the two transistors being connected with their current flow electrodes in series, B. storage means connected to the gate electrode of said first transistor, C. means for applying a binary data input to said storage means and said first transistor gate electrode, D. an output terminal coupled to said second transistor, E. means for supplying a first pulse to said output terminal through said first transistor independent of the binary state of said data input appearing at said first transistor gate electrode, and F. means coupled to said second transistor for supplying a clocking pulse to control said second transistor in an overlapping time relationship to said first pulse.

2. A shift register comprising a plurality of storage circuits as in claim 7 with the storage means of succeeding storage circuits connected to the current flow electrode of the second transistor of a preceding storage circuit remote from the first transistor of the preceding storage circuit.

3. A shift register as in claim 8 in which the circuits are arranged in a plurality of groups, the clocking pulse sources of the storage circuits in said group providing together a series of staggered clocking pulses, the number of storage circuits in each group corresponding to the number of different clocking pulses.

4. A storage circuit comprising:

A. a first field effect transistor having two current flow electrodes, a gate electrode, and having a given threshold value, B. a capacitor connected between one of the current flow electrodes and the gate electrode of said first field effect transistor, said capacitor selectively having a given charge below said threshold value, C. a data input coupled to charge said capacitor, D. a source of a pulse connected to the current flow electrode of said first field effect transistor to which said capacitor is connected to couple a sufficient amount of alternating current energy from said pulse through said capacitor to the gate electrode of said first field effect transistor when the charge on said capacitor is below the threshold value of said first field effect transistor to exceed the threshold value of said first field effect transistor momentarily, thus to turn on said first field effect transistor for supplying the remainder of the energy from the pulse through said first field effect transistor to the other current flow electrode independent of the state of said capacitor.

E. a second field effect transistor having two current flow electrodes and a gate electrode, one of said current flow electrodes being connected to the other current flow electrode of said first field effect transistor, F. a capacitor connected to the other current flow electrode of said second field effect transistor, and G. a clocking pulse source coupled to supply locking pulses for turning on said second field effect transistor in an overlapping relationship to the pulses supplied by said source of pulses.

5. A shift register comprising an interconnected plurality of the circuits of claim 4, in which said plurality of circuits are arranged in a plurality of groups, the clocking pulse sources of the storage circuits in said group providing together a series of staggered clocking pulses, the number of storage circuits in each said group corresponding to the number of different clocking pulses, in which data flow through said shift register is in a given direction and the staggered clocking pulses are applied sequentially to the circuits in said group in reverse order to the given direction.

6. A shift register as in claim 1 in which one electrode of said capacitors is a gate of a field effect transistor, and the other electrode is a diffusion forming a part of the field effect transistor in a semiconductor substrate.

7. A storage circuit comprising:

A. a first field effect transistor having first and second current flow electrodes, a gate electrode, and a given threshold value, B. a first capacitor connected between the gate electrode and the first current flow electrode of said first field effect transistor, C. a second field effect transistor having a first and second current flow electrode and a gate electrode, having its first current flow electrode connected to the second current flow electrode of said first field effect transistor, D. a second capacitor having one of its electrodes connected to the second current flow electrode of the second field effect transistor, E. a source of a first pulse connected to the first current flow electrode of said first field effect transistor, said first pulse supplying a sufficient amount of alternating current energy to couple through said first capacitor to the gate electrode of said first field effect transistor to exceed the threshold value of the said first field effect transistor momentarily in the absence of charge on said first capacitor, thus to turn on said first transistor for supplying the remainder of the energy from said first pulse through said first transistor to the second current flow electrode of said first field effect transistor independent of the state of said capacitor, F. a clocking pulse source coupled to supply a clocking pulse to turn on said second field effect transistor in overlapping time relationship to said first pulse, said first pulse terminating prior to termination of said clocking pulse, and G. an input signal source connected to the gate of the first field effect transistor.

8. A shift register comprising:

A. an interconnected plurality of storage circuits comprising:
   1. a first field effect transistor having two current flow electrodes and a gate electrode,
   2. a capacitor connected between one of the current flow electrodes and the gate electrode of said first field effect transistor,
   3. a data input coupled to charge said capacitor,
   4. a source of pulses connected to the current flow electrode of said first field effect transistor to which said capacitor is connected,
   5. a second field effect transistor having two current flow electrodes and a gate electrode, one of said current flow electrodes being connected to the other current flow electrode of said first field effect transistor,
   6. a capacitor connected to the other current flow electrode of said second field effect transistor, and
   7. a clocking pulse source coupled to supply clocking pulses for turning on said second field effect transistor in an overlapping relationship to the pulses supplied by said source of pulses, B. a data input storage circuit at the beginning of said shift register; and C. a data output storage circuit at the end of said shift register;

said data input and data output storage circuits each comprising:
   1. first and second field effect transistors each having two current flow electrodes and a gate electrode and being series connected by their current flow electrodes,
   2. a diode connected in parallel to said first field effect transistor across the two current flow electrodes of said first field effect transistor, to allow current flow around said first field effect transistor to said second field effect transistor,
   3. a pulse source coupled to pass a pulse through said diode to said second field effect transistor,
   4. a capacitor connected to the current flow electrode of said second field effect transistor remote from said first field effect transistor, and
   5. a clocking pulse source adapted to supply a clocking pulse, in an overlapping relationship to the pulse supplied by said pulse source coupled to said diode, to the gate of said second field effect transistor.

9. A shift register comprising:

A. an interconnected plurality of storage circuits comprising:
   1. a first field effect transistor having two current flow electrodes and a gate electrode,
   2. a capacitor connected between one of the current flow electrodes and the gate electrode of said first field effect transistor,
   3. a data input coupled to charge said capacitor,
   4. a source of pulses connected to the current flow electrode of said first field effect transistor to which said capacitor is connected,
   5. a second field effect transistor having two current flow electrodes and a gate electrode, one of said current flow electrodes being connected to the other current flow electrode of said first field effect transistor,
   6. a capacitor connected to the other current flow electrode of said second field effect transistor, and
   7. a clocking pulse source coupled to supply clocking pulses for turning on said second field effect transistor in an overlapping relationship to the pulses supplied by said source of pulses, B. a data input storage circuit at the beginning of said shift register; and C. a data output storage circuit at the end of said shift register; said data input and data output storage circuits each comprising:
   1. first and second field effect transistors each having two current flow electrodes and a gate electrode and being series connected by their current flow electrodes,
   2. a third field effect transistor having two current flow electrodes and a gate electrode, one of the current flow electrodes and the gate electrode of said third field effect transistor being in a common connection to the current flow electrode of said first field effect transistor remote from said second field effect transistor, the other current flow electrode of said third field effect transistor being connected to the other current flow electrode of said first field effect transistor,
   3. a pulse source connected to the current flow electrode of said third field effect transistor in common connection with the gate electrode of said third field effect transistor,
   4. a capacitor connected to the current flow electrode of said second field effect transistor remote from said first field effect transistor, and
   5. a clocking pulse source adapted to supply a clocking pulse, in an overlapping relationship to the pulse supplied by said pulse source connected to the first electrode of said third field effect transistor, to the gate of said second field effect transistor.

10. A shift register as in claim 10 in which said terminating storage circuit is coupled to said initial storage circuit to allow recirculation of information in said shift register.

* * * * *

PO-1050
(5/69)

UNITED STATES PATENT OFFICE
CERTIFICATE OF CORRECTION

Patent No. 3,648,063 Dated March 7, 1972

Inventor(s) William K. Hoffman and John W. Sumilas

It is certified that error appears in the above-identified patent and that said Letters Patent are hereby corrected as shown below:

Column 8, Line 53, after "supply" delete "locking" and substitute therefor -- clocking --.

Signed and sealed this 24th day of April 1973.

(SEAL)
Attest:

EDWARD M.FLETCHER,JR.
Attesting Officer

ROBERT GOTTSCHALK
Commissioner of Patents